(12) United States Patent
Paterour

(10) Patent No.: US 9,503,880 B2
(45) Date of Patent: Nov. 22, 2016

(54) METHOD FOR MANAGING THE MOBILITY OF A NODE

(71) Applicant: AIRBUS DS SAS, Elancourt (FR)

(72) Inventor: Olivier Paterour, Guyancourt (FR)

(73) Assignee: AIRBUS DS SAS, Elancourt (FR)

( * ) Notice: Subject to any disclaimer, the term of this patent is extended or adjusted under 35 U.S.C. 154(b) by 0 days.

(21) Appl. No.: 14/897,515

(22) PCT Filed: Jun. 10, 2014

(86) PCT No.: PCT/FR2014/000127
§ 371 (c)(1),
(2) Date: Dec. 10, 2015

(87) PCT Pub. No.: WO2014/199026
PCT Pub. Date: Dec. 18, 2014

(65) Prior Publication Data
US 2016/0127885 A1 May 5, 2016

(30) Foreign Application Priority Data

Jun. 10, 2013 (FR) ..................................... 13 55340

(51) Int. Cl.
*H04B 1/3816* (2015.01)
*H04W 8/14* (2009.01)
*H04W 36/14* (2009.01)
(Continued)

(52) U.S. Cl.
CPC ................ *H04W 8/14* (2013.01); *H04L 45/48* (2013.01); *H04L 45/745* (2013.01); *H04W 4/001* (2013.01); *H04W 36/14* (2013.01); *H04W 36/165* (2013.01); *H04W 80/045* (2013.01); *H04L 69/321* (2013.01); *H04W 88/06* (2013.01)

(58) Field of Classification Search
CPC ..... H04W 8/14; H04W 36/14; H04B 1/3816
USPC ............................................... 455/432.1, 558
See application file for complete search history.

(56) References Cited

U.S. PATENT DOCUMENTS 7,885,231 B2 * 2/2011 Kim .................. H04W 36/0033
370/331
8,020,157 B2 9/2011 Alnås et al.
(Continued)

OTHER PUBLICATIONS

International Search Report as issued in International Patent Application No. PCT/FR2014/000127, dated Oct. 21, 2014.
(Continued)

*Primary Examiner* — Christopher M Brandt
(74) *Attorney, Agent, or Firm* — Pillsbury Winthrop Shaw Pittman LLP

(57) ABSTRACT

A method for managing the mobility of a mobile node in telecommunications networks, which include first and second telecommunications networks, the mobile node including a memory area that stores data concerning the mobility of the mobile node in the networks, a first module for managing the mobility of the mobile node, to establish, through the first network, from an item of mobility data, a mobility session with a home agent, and, a second module for managing the mobility of the mobile node, to establish, through the second network, from an item of mobility data, a mobility session with the home agent, the method including accessing by the first module the mobility data stored in the memory area, and obtaining, by the second module, from the first module, at least one item of mobility data from the set of data that is accessible by the first module.

12 Claims, 2 Drawing Sheets

(51) Int. Cl.
*H04W 4/00* (2009.01)
*H04W 80/04* (2009.01)
*H04L 12/753* (2013.01)
*H04L 12/741* (2013.01)
*H04W 36/16* (2009.01)
*H04W 88/06* (2009.01)
*H04L 29/08* (2006.01)

(56) References Cited

U.S. PATENT DOCUMENTS

| | | | |
|---|---|---|---|
| 9,049,596 B1* | 6/2015 | Kronrod | H04W 12/06 |
| 9,107,166 B2* | 8/2015 | Mach | H04W 52/0258 |
| 2007/0248054 A1* | 10/2007 | Chen | H04W 8/06 |
| | | | 370/331 |
| 2008/0293414 A1* | 11/2008 | Lin | H04M 1/72519 |
| | | | 455/435.2 |
| 2011/0029607 A1 | 2/2011 | Rao | |
| 2011/0164588 A1* | 7/2011 | Kwon | H04W 36/0022 |
| | | | 370/331 |

OTHER PUBLICATIONS

International Preliminary Report on Patentability and the Written Opinion of the International Searching Authority as issued in International Patent Application No. PCT/FR2014/000127, dated Dec. 15, 2015.

Standardized Connectivity Management Objects, for Use with Oma Device Management, Approved Version 1.0 — Nov. 7, 2008; Open Mobile Alliance OMA-DDS-DM_ConnMO-V1_0-20081107-A, 40 pages.

* cited by examiner

METHOD FOR MANAGING THE MOBILITY OF A NODE

CROSS-REFERENCE TO RELATED APPLICATIONS

This is the U.S. National Stage of PCT/FR2014/000127, filed Jun. 10, 2014, which in turn claims priority to French Patent Application No. 1355340, filed Jun. 10, 2013, the entire contents of all applications are incorporated herein by reference in their entireties.

TECHNICAL FIELD AND OBJECT OF THE INVENTION

The invention relates to the field of telecommunications and more particularly to managing the mobility of a node through a plurality of telecommunications networks. For this purpose, the invention relates to a method and a system for managing the mobility of a node in a plurality of telecommunications networks as well as such a mobile node.

STATE OF THE ART

During its moves, a mobile node connects in a known manner to different telecommunications networks using the Internet Protocol (IP) in order to maintain one or more communications sessions through one or more of these networks.

By way of example, these different types of networks supporting the Internet Protocol, referred to thereafter as "IP networks", can be networks of the Wireless Local Area Network (WLAN), Third Generation Partnership Project Packet Switched (3GPP PS), Code Division Multiple Access (CDMA), Long-Term Evolution (4G-LTE) or Long-Term Evolution Advanced (4G-LTE Advanced) type.

Conventionally, for each type of IP network, a mobile node is associated with at least one IP network known as a "home" or "core" network but can also move outside this core IP network towards an IP network known as an "external" or "foreign" network of the same type as the core IP network. For example, a mobile node can be associated with a core IP 3GPP PS network and can move and connect to one or more other external IP 3GPP PS networks.

In order to manage the mobility of mobile nodes between two networks, such as for example a core IP network and an external IP network or two core IP networks of different types, it is known to use a server for managing the mobility referred to as a Home Agent (HA) connected to at least one core IP network and configured to communicate with the mobile nodes using a communication protocol referred to as "Mobile Internet Protocol" or "Mobile IP" (MIP) such as for example MIPv4 or MIPv6.

"Mobile IP" is a standard communications protocol from IETF (Internet Engineering Task Force) which was designed to enable the users to move from their core IP network towards an external IP network while maintaining the communications active and the same IP address. Implementing the IP mobility for IPv4 is described in the RFC 5944, with extensions described in RFC 4721. Implementing the IP mobility for IPv6 is defined in RFC 6275.

In order to maintain a communication when moving from a network to another, a mobile node communicates in a known manner with its home agent through a session known as "mobility session" using the Mobility IP Protocol (MIP). To this end, the mobile node stores in a memory area a set of data, referred to thereafter as "mobility data", which it can use, for example, to connect to the home agent or to enable its authentication in order to connect to a network.

Each type of IP network can use its own home agent or a same home agent known as a "common home agent" to manage the IP mobility of the mobile nodes. For example, a WLAN-type network and a 3GPP PS-type network can use a first common home agent and a CDMA-type network can use a second home agent different from the first home agent.

Conventionally, the mobile node comprises as many modules for managing the IP mobility as there are types of networks to which it can connect, each of the modules including a set of mobility data corresponding to a predetermined home agent. Thus, in the abovementioned example, when the mobile node is connected to its core 3GPP PS network, it communicates with the first common home agent via a first management module associated with said core 3GPP PS network, since when it has moved in its core WLAN network, it communicates with the first common home agent via a second management module associated with said core WLAN network.

In a known solution of the Open Mobile Architecture (OMA) type in which the data are organized as a tree structure, it is known to define a tree structure of data for each type of telecommunications network. Thus, when several networks of different types use a common home agent, the tree structures of mobility data are duplicated for each of the associated management modules. In this case, any addition, modification or deletion of mobility data must be performed in each of the management modules, which increases both the risk of input error and the maintenance to be performed on the mobile node and thus has a significant drawback.

GENERAL DISCLOSURE OF THE INVENTION

The purpose of the present invention is to overcome these drawbacks by providing a simple, open, and efficient solution for managing the mobility of a mobile node through a plurality of telecommunications networks.

To do so, the object of the invention is first a method for managing the mobility of a mobile node in a plurality of telecommunications networks, said plurality of telecommunications networks comprising at least a first telecommunications network and a second telecommunications network, said mobile node comprising:
  a memory area, in which a set of data concerning the mobility of the mobile node in the plurality of networks is stored,
  a first module for managing the mobility of said mobile node configured to establish through the first network, from at least one mobility data, a mobility session with a attach agent, and,
  a second module for managing the mobility of said mobile node, configured to establish through the second network, from at least one mobility data, a mobility session with said attach agent,
the method being noteworthy in that, the first module being configured to access the set of mobility data stored in the memory area, it comprises a step of obtaining, by the second module, from the first module, at least one mobility data from the set of data that can be accessed by the first module.

Thus, the mobility data of the mobile node are advantageously stored in a single place, that can be accessed by the first module, so that any addition, modification or deletion of mobility data is only performed in a single memory area and does not need to be duplicated in a second memory area that can be accessed by the second module. The maintenance time and cost are therefore advantageously reduced as well as the number of mobility data input errors since the later are only inputted in a single memory area.

The term "mobility data" means the data necessary to a mobile node to connect, during a mobility session with a attach agent based on a Mobility IP Protocol (MIP), to a second telecommunication network during a mobility from a first telecommunications network. The mobility data can comprise data for authenticating a user of the mobile node with an authentication server (for example an Authentication Authorization Accounting, AAA, server) such as for example a shared key, data used to establish a mobility session between the mobile node and the attach agent comprising for example a shared key, the IP address of the attach agent, an index of safety parameters, data for configuring the options of the MIP exchange protocol between the mobile node and the attach agent (timer, number of repeats, etc.).

With the method according to the invention, when the second module needs an mobility data, such as for example an encryption key enabling an authentication to establish a communication through one of the networks, it obtains it from the first module, which can access the memory area in which the key is stored, then leads to a mobility session with the attach agent using said thus obtained encryption key in order to perform its authentication.

Preferably, the mobility data being identified by an address, the second module obtains said data from said address.

Advantageously, the address of the mobility data being stored in a second memory area of the mobile node that can be accessed by the second module, the method comprises a preliminary step of obtaining said address.

According to a feature of the invention, the method comprises a step of using the obtained mobility data in order to enable, via the attach agent, at least one communication to be established with a second mobile node through the second telecommunications network.

According to an aspect of the invention, this using step comprises a step of authenticating the mobile node performed through the attach agent during the mobility session of the mobile node.

The invention also relates to a mobile node configured to access a plurality of telecommunications networks, said plurality of telecommunications networks comprising at least a first telecommunications network and a second telecommunications network, said mobile node comprising:
  a memory area, in which a set of data concerning the mobility of the mobile node in the plurality of networks is stored,
  a first module for managing the mobility of said mobile node configured to establish through the first network, from at least one mobility data, a mobility session with a attach agent, and,
  a second module for managing the mobility of said mobile node, configured to establish through the second network, from at least one mobility data, a mobility session with said attach agent,
  the mobile node being noteworthy in that the first module is configured to access the set of mobility data stored in the memory area and in that the second module comprises means for obtaining, from the first module, at least one mobility data from the set of data that can be accessed by the first module.

Preferably, the mobility data being identified in the memory area by an address, the obtaining means are configured to obtain the data from said address.

Advantageously, the address of the mobility data is in the form of a uniform resource identifier. Such an address is in the form of a character chain and therefore enables the mobility data to be easily obtained.

According to a feature of the invention, the set of mobility data is organized as an Open Mobile Architecture (OMA)-type tree structure. Such an organization enables the data to be easily and quickly identified in order to obtain it.

The use of such an open protocol enables, from an OMA server for managing mobile nodes that can be accessed through the different networks, the mobility data of the set of mobile nodes supporting this OMA protocol to be uniformly managed, whatever the type of network to which they are attached and whatever their specificities. A mobile node can thus advantageously connect to any type of network the mobility data of which are organized according to the OMA model.

According to another feature of the invention, the plurality of networks comprising a third telecommunications network, the mobile node comprises a third module for managing the mobility configured to establish through said third network, from at least one mobility data, a mobility session with a second attach agent. The mobile node can thus advantageously communicate, for example simultaneously, with two different attach agents through two different networks, respectively.

Advantageously, the plurality of networks comprising a fourth telecommunications network, the mobile node comprises a fourth module for managing the mobility configured to establish through said fourth network, from at least one mobility data, a mobility session with the second attach agent. The mobile node can thus manage two mobility sessions in parallel enabling the simultaneous mobility of the mobile node between, on the one hand, the first network and the second network, and, on the other hand, the third network and the fourth network.

The mobile node can be a mobile terminal or a mobile server.

In an embodiment, the mobile node is a mobile server comprising at least one, preferably a plurality of modules for connecting at least one terminal to said mobile server in order to establish, via the mobile server, one or more communication sessions through at least one of the telecommunications networks.

The invention also relates to a telecommunications system which is noteworthy in that it comprises:
  a plurality of telecommunications networks comprising at least a first telecommunications network and a second telecommunications network,
  a attach agent, and,
  a mobile node such as previously set forth.

Preferably, the networks of the plurality of telecommunications networks are networks supporting the Internet Protocol (IP).

According to an aspect of the invention, the first telecommunications network and the second telecommunications network are core networks of different types. The term "core networks" means core networks for the mobile node.

According to an aspect of the invention, the plurality of networks comprises a third telecommunications network, the system comprises a second attach agent and the mobile node comprises a third module for managing the mobility configured to establish through said third network, from at least one mobility data, a mobility session with said second attach agent.

Advantageously, the plurality of telecommunications networks comprises a fourth telecommunications network and the mobile node comprises a fourth module for managing the mobility configured to establish through said fourth network, from at least one mobility data, a mobility session with the second attach agent. The mobile node can thus manage two mobility sessions in parallel enabling the simultaneous mobility of the mobile node between, on the one hand, the first network and the second network, and, on the other hand, the third network and the fourth network.

For example, the first network can be a 3GPP PS core network, the second network can be a WLAN core network, the third network can be a CDMA core network and the fourth network can be a network of the Tetra, Tetrapol, P25 or another type.

Preferably, the mobile node is a mobile server and the system comprises at least one terminal, preferably a plurality of terminals connected to said mobile server in order to establish, via the mobile server, one or more communications through at least one of the telecommunications networks.

Other features and advantages of the invention will appear upon reading the following description made with respect to the accompanying figures given by way of non-limiting examples and in which identical reference numerals are given to similar objects.

DETAILED DESCRIPTION OF THE INVENTION

The invention is applied in managing the mobility of a mobile node through a plurality of telecommunications networks.

Such a mobile node can be a mobile terminal or a mobile server to which a plurality of terminals can connect.

Figure 1:
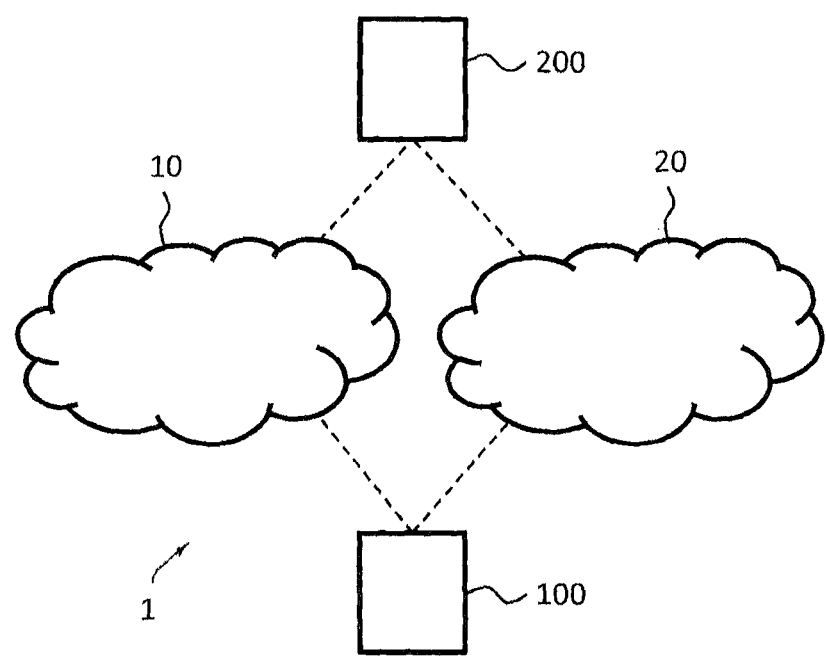
FIG. 1 schematically depicts an embodiment of a telecommunications system according to the invention.

The invention is thereafter described with reference to a plurality of telecommunications IP networks but can of course be applied in managing the mobility of a mobile node through any type of telecommunications networks.
System The embodiment of the telecommunications system 1 according to the invention depicted in FIG. 1 comprises a first telecommunications IP network 10, a second telecommunications IP network 20, a mobile node 100 and a attach agent 200.

In this example, the first network 10 is a 3GPP PS core IP network of the mobile node 100 and the second network 20 is a WLAN core IP network of the mobile node 100.
Mobile Node As depicted in FIG. 2, the mobile node 100 comprises a first module 110 for managing the mobility of the mobile node 100 and a second module 120 for managing the mobility of the mobile node 100.

The first module 110 is configured to communicate with the attach agent 200 using the Mobile IPv4 (MIPv4) and/or IPv6 (MIPv6) protocol during a mobility session. Such a mobility session particularly enables a communication session to be established through the second network 20, due to a mobility of the first network 10 towards the second network 20, in order to continue a previously initiated communication through the first network 10.

Figure 2:
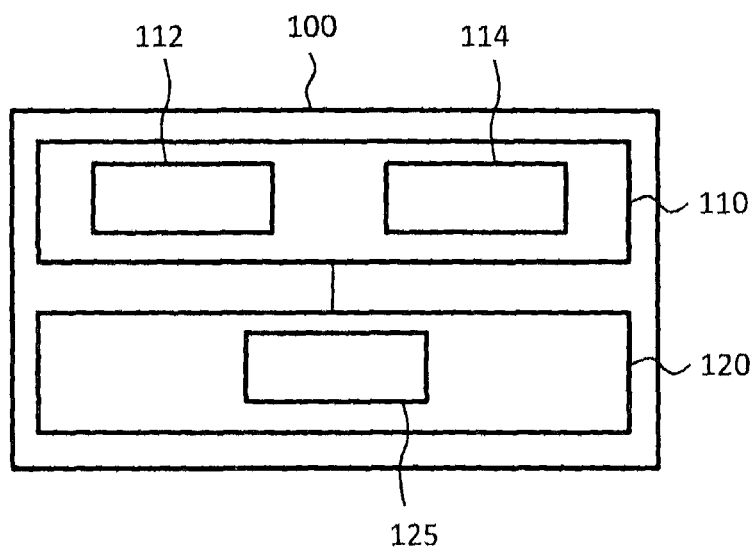
FIG. 2 schematically depicts an embodiment of a mobile node according to the invention.
Figure 3:
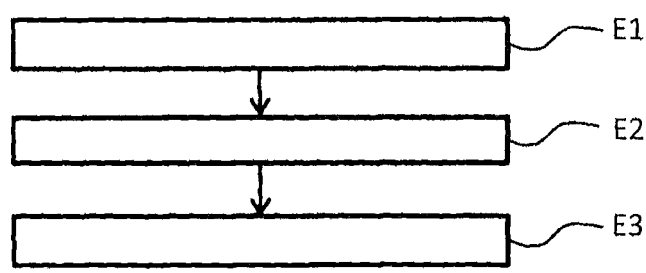
FIG. 3 depicts an embodiment of the method according to the invention.

In this example, still with reference to FIG. 2, the first module 110 for managing the mobility comprises a first MIPv4 management sub-module 112, a second MIPv6 management sub-module 114.

The first IPv4 management sub-module 112 comprises IPv4 mobility data. Also, the second IPv6 management sub-module 114 comprises IPv6 mobility data.

Mobility data can comprise data for authenticating a user of the mobile node with an authentication server (for example an Authentication Authorization Accounting, AAA, server) such as for example a shared key, data used to establish a mobility session between the mobile node and the attach agent comprising, for example, a shared key, the IP address of the attach agent, an index of safety parameters, data enabling options of the MIP exchange protocol between the mobile node and the attach agent (timer, number of repeats, etc.) to be configured.

The second module 120 for managing the mobility of the mobile node 100 is configured to communicate with the attach agent 200 using the Mobile IPv4 (MIPv4) and/or IPv6 (MIPv6) protocol during a mobility session particularly enabling a communication session to be established through the second network 20, due to a mobility of the first network 10 towards the second network 20, to continue a previously initiated communication through the first network 10.

The set of mobility data of the mobile node 100 is stored in a memory area (not represented) of the mobile node 100 that can be accessed by the first module 110.

According to the invention, the second module 120 for managing the mobility comprises obtaining means 125 configured to obtain from the first module 110, at least one mobility data from the set of data that can be accessed by the first module 110.

In this example, the second module 120 is further configured to previously obtain the address of the mobility data to be used during a mobility session with the attach agent 200.

Advantageously, the address of the mobility data is in the form of a uniform resource identifier. Such an identifier is in the form of a character chain which enables the mobility data to be easily obtained. In this example, the set of mobility data of the mobile node 100 is organized as an OMA type tree structure.

Organization of Data According to the OMA Tree Structure

The OMA tree structure defines in a known manner an object referred to as an IP Managed Object (MO) to which four data nodes are linked: the IPv4, IPv6 nodes for managing IPv4 and IPv6 protocols respectively and the MIPv4 and MIPv6 nodes for managing the MIPv4 and MIPv6 mobility respectively.

According to the invention, a new data node referred to as MIPRef is added to the IP MO object with the following OMA properties:

Access Type: Get, Replace

Occurrence: ZeroOrOne

Format: chr

Value: not indicated or URI towards the MO which has for example the definition: "./ManagedObjects/ConnMo/Modulel/IP".

The MIPRef data node enables the whole MIPv4 and MIPv6 definition to be accessed.

If the MIPRef data node does not exist, or exists but the field "value" is not documented, or exists but the field "value" is incorrect (points to a module which does not exist or to a module which exists but does not include an MPIv4 or MIPv6 definition), then the MIP definition corresponding to the associated module must be explicitly defined in MIPv4 and MIPv6 for the functionality to be able to be implemented.

If the MIPRef data node is documented for the module N, and thus points to a module P including a valid MIPv4 and MIPv6 definition, then the MIPv4 and MIPv6 MOs of the module N are irrelevant.

We can clearly see all the flexibility of the definition making it possible to respond to any evolution or convergence on the side of the access networks in a very simple way by documenting or not the MIPRef data node.

Illustration of an Embodiment of the Method According to the Invention

In this example, the mobile node 100 has previously established a communication session through the first telecommunications IP network 10.

When it moves from the first network 10 into the second network 20, the mobile node 100 establishes a mobility session with the attach agent 200 in order to establish a new communication session through the second network 20 enabling the previously established communication session to be maintained through the first network 10.

To do so, the second module 120 uses one or more mobility data stored in the memory area that can be accessed by the first module 110.

According to the invention, the obtaining means 125 obtain, in a first step E1, the address(es) respectively of the data mobility to be used during the mobility session. The addresses can be advantageously stored in a second memory area (not represented) that can be accessed by the second module 120, for example comprised in the second module 120.

Then, in a step E2, the obtaining means 125 obtain, from the first module 110 which can access the memory area for storing the set of mobility data, said mobility data using said obtained address(es).

Finally, in a step E3, the second module 120 uses the obtained mobility data, for example by sending them to the attach agent 200, in order to enable, via the attach agent 200, a communication session to be established through the second telecommunications network 20 enabling the previously established communication to be openly continued on the first network 10.

The invention therefore advantageously enables the mobility data of a mobile node to be efficiently and easily managed by storing them in a single memory area.

The invention claimed is:

1. A method for managing the mobility of a mobile node in a plurality of telecommunications networks, said plurality of telecommunications networks comprising at least a first telecommunications network and a second telecommunications network, said mobile node including a memory area, in which a set of data concerning the mobility of the mobile node in the plurality of telecommunications networks is stored;

a first module configured to manage the mobility of said mobile node configured to establish through the first telecommunications network, from at least one mobility data, a mobility session with a attach agent, and, a second module configured to manage the mobility of said mobile node, configured to establish through the second telecommunications network, from at least one mobility data, a mobility session with said attach agent, wherein the first module is different than the second module, the method comprising:

accessing by the first module the set of mobility data stored in the memory area, and obtaining, by the second module, from the first module, at least one mobility data from the set of data that is accessible by the first module.

2. The method according to claim 1, wherein, the mobility data being identified by an address, the method further comprising obtaining by second module said data from said address.

3. The method according to claim 2, the address of the mobility data being stored in a second memory area of the mobile node that is accessible by the second module, the method comprises a preliminary step of obtaining said address.

4. The method according to claim 1, said method comprising using said obtained mobility data in order to enable, via the attach agent, at least one communication to be established through the second telecommunications network.

5. The method according to claim 1, wherein the set of mobility data is organized as an Open Mobile Architecture type tree structure.

6. A mobile node configured to access a plurality of telecommunications networks, said plurality of telecommunications networks comprising at least a first telecommunications network and a second telecommunications network, said mobile node comprising:

a memory area, in which a set of mobility data of the mobile node (100) in the plurality of networks is stored;

a first module configured to manage the mobility of said mobile node configured to establish through the first telecommunications network, from at least one mobility data, a mobility session with a attach agent, and, a second module configured to manage the mobility of said mobile node configured to establish through the second telecommunications network, from at least one mobility data, a mobility session with said attach agent, wherein the first module is different than the second module, wherein the first module is configured to access the set of mobility data stored in the memory area and wherein the second module comprises means for obtaining, from the first module, at least one mobility data from the set of data that is accessible by the first module.

7. The mobile node according to claim 6, wherein, the mobility data being identified in the memory area by an address, the obtaining means are configured to obtain the data from said address.

8. The mobile node according to claim 7, wherein the address of the mobility data is in the form of a uniform resource identifier.

9. The mobile node according to claim 6, wherein the set of mobility data is organized as an Open Mobile Architecture type tree structure.

10. The mobile node according to claim 6, wherein, the plurality of networks comprising a third telecommunications network and a fourth telecommunications network, the mobile server comprises a third module configured to manage the mobility, configured to establish through said third telecommunications network, from at least one mobility data, a mobility session with a second attach agent, and a fourth module configured to manage the mobility, configured to establish through said fourth telecommunications network, from at least one mobility data, a mobility session with said second attach agent.

11. The mobile node according to claim 6, said mobile node being a mobile server comprising a plurality of modules configured to connect at least one terminal to said mobile server in order to establish, via the mobile server, one or more communication sessions through at least one of the telecommunications networks.

12. A telecommunications system comprising:
    a plurality of telecommunications networks comprising at least a first telecommunications network and a second telecommunications network,
    a attach agent, and,
    a mobile node according to claim 1.

\* \* \* \* \*